United States Patent
Weese et al.

(10) Patent No.: US 7,062,078 B2
(45) Date of Patent: Jun. 13, 2006

(54) METHOD AND DEVICE FOR THE REGISTRATION OF IMAGES

(75) Inventors: Juergen Weese, Henstedt-Ulzburg (DE); Thomas Netsch, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 756 days.

(21) Appl. No.: 10/003,051

(22) Filed: Nov. 2, 2001

(65) Prior Publication Data

US 2002/0122576 A1    Sep. 5, 2002

(30) Foreign Application Priority Data

Nov. 4, 2000 (DE) ................. 100 54 814

(51) Int. Cl.
*G06K 9/00* (2006.01)
*G06K 9/32* (2006.01)

(52) U.S. Cl. .................. 382/131; 382/294

(58) Field of Classification Search ........... 382/131, 382/276, 286, 289, 294, 296, 295, 298, 232, 382/154

See application file for complete search history.

(56) References Cited

U.S. PATENT DOCUMENTS

| | | | |
|---|---|---|---|
| 2,277,685 A | 3/1942 | Bergstrom ............. 240/41.25 |
| 4,638,408 A | 1/1987 | Wetherington ............. 362/61 |
| 5,172,419 A * | 12/1992 | Manian ................... 382/132 |
| 5,633,951 A * | 5/1997 | Moshfeghi ............... 382/154 |
| 6,009,212 A * | 12/1999 | Miller et al. ............. 382/294 |
| 6,368,285 B1 * | 4/2002 | Osadchy et al. .......... 600/508 |
| 6,373,970 B1 * | 4/2002 | Dong et al. .............. 382/128 |
| 6,456,743 B1 * | 9/2002 | Charrier et al. ........... 382/248 |
| 6,563,941 B1 * | 5/2003 | O'Donnell et al. ........ 382/131 |
| 6,594,403 B1 * | 7/2003 | Bozdagi et al. ........... 382/284 |
| 6,633,686 B1 * | 10/2003 | Bakircioglu et al. ...... 382/294 |
| 6,665,438 B1 * | 12/2003 | Lin ........................ 382/191 |
| 6,674,916 B1 * | 1/2004 | Deman et al. ............ 382/276 |
| 6,687,528 B1 * | 2/2004 | Gupta et al. ............. 600/410 |
| 6,748,347 B1 * | 6/2004 | Dalton ......................... 703/5 |
| 2002/0141626 A1 * | 10/2002 | Caspi ...................... 382/131 |
| 2002/0168095 A1 * | 11/2002 | Spreeuwers et al. ...... 382/131 |
| 2003/0063787 A1 * | 4/2003 | Natanzon et al. ......... 382/131 |
| 2003/0095696 A1 * | 5/2003 | Reeves et al. ............ 382/131 |
| 2003/0202701 A1 * | 10/2003 | Schuler ................... 382/209 |
| 2004/0096089 A1 * | 5/2004 | Borsook et al. .......... 382/131 |
| 2004/0136584 A1 * | 7/2004 | Acar et al. ............... 382/131 |

FOREIGN PATENT DOCUMENTS

| | | |
|---|---|---|
| DE | 2757713 | 6/1979 |
| WO | WO8706325 | 4/1987 |

OTHER PUBLICATIONS

"Medical Image Matching—a review with classification", IEEE Eng. Med. Bio. 12, (1993) pp. 26-29.

* cited by examiner

*Primary Examiner*—Duy M. Dang

(57) ABSTRACT

The invention relates to a method for the registration of a series of at least three temporally successively acquired images ($I_1$–$I_n$) of an object. Individual images ($I_2$–$I_n$) to be registered are transformed into registered images ($I_2'$-$I_n'$) using an individual mapping rule ($T_2$–$T_n$). A similarity measure (M) is used to determine a mapping rule ($T_2$–$T_n$), where to achieve a higher registration accuracy, a common similarity measure (M) of all images ($I_1'$-$I_n'$) in order to determine the mapping rules ($T_2$–$T_n$) for all images is implemented. The invention also relates to a corresponding registration device.

10 Claims, 4 Drawing Sheets

METHOD AND DEVICE FOR THE REGISTRATION OF IMAGES

The invention relates to a method for the registration of a series of at least three temporally successively acquired images of an object, and also to a corresponding registration device. The invention also relates to a device for the temporally successive acquisition of a series of medical image data from an examination zone of an object to be examined, as well as to a computer program for carrying out such a method and/or for controlling such a device.

For the evaluation of temporally successively acquired images it is often necessary to register such images during a first step of the image processing operation in order to compensate notably for undesirable motions that have occurred during the acquisition of the images and that would falsify the evaluation result. Such motions may be motions of the object itself as well as motions of the image acquisition device. Registration in this context is to be understood to mean that it is determined how the various images have to be mapped on one another; notably the translations and/or rotations are determined whereto the object or the image acquisition device has been subject between the acquisition of the individual images that must be compensated prior to the evaluation of the images.

For example, when temporally successively acquired images of the night sky have to be combined or compared so as to derive astronomic data, it is first necessary to eliminate any motions of the image acquisition device, for example of the stand of the camera, and to determine the exact positional relationship between the images. The evaluation result would otherwise be falsified.

A further example in this respect is formed by medical image data, for example data from functional magnetic resonance tomography where often approximately 100 three-dimensional images are acquired. Motions of the head of the patient during the image data acquisition would definitely degrade the evaluation result, that is, the resultant functional survey image. Compensation for such motions, therefore, is an absolute must. A high registration accuracy is also necessary since even slight inaccuracies and interpolation errors would already give rise to artifacts in the resultant functional survey images.

According to known registration methods, for example as described in "Medical Image Matching—a review with classification", IEEE Eng. Med. Bio. 12, (1993) pp. 26–29, the registration is performed on the basis of image structures, for example boundary structures or special image characteristics, or on the basis of gray values of the images. In any case only two images are considered and a mapping rule is determined between only two images to be registered, said rule being used to transform one of the two images to the other so that they register. In order to determine the mapping rule, customarily use is made of a similarity measure, but also this measure is determined only for the two images that are examined and have to be registered. One of these two images represents the reference image with which the other image is registered.

In the case of a series of temporally successively acquired images, all images are thus registered with a fixed reference image in the known methods, or each image is registered with the temporally preceding image that has already been registered. The available information, however, is not optimally used in that case, so that the registration accuracy is not optimum. For example, it may occur that a reference image that has been selected for the registration is not optimum for all images to be registered, for example, because structures that are contained in many of the images to be registered are not shown in the reference image. In the case of registration with the respective temporally preceding image, however, registration errors that have occurred during the first registration steps can be taken up in further registration steps and may accumulate or propagate through all registration steps.

The invention, therefore, has for its object to provide a method and a device for the registration of a series of temporally successively acquired images of an object in which said drawbacks have been mitigated and which notably yield an optimum registration result while making optimum use of the information available in the images to be registered.

This object is achieved by means of a method as disclosed, and by means of a device as disclosed.

The invention is based on the recognition of the fact that for the registration of images, instead of observing each time only two images separately and determining the mapping rule on the basis of a similarity measure calculated for these two images only, it makes more sense to determine a similarity measure from the data of all images so as to determine the mapping rule for two images to be registered, or to determine mapping rules for more than two images, and to use said similarity measure so as to decide whether the quality of the current mapping rule used is adequate or not.

The determination of the mapping rules is preferably performed iteratively. This means that in a first step one or more mapping rules are selected for one or more images to be registered and that in a second step the similarity measure is determined for all images to be registered, that is, not only for the image that is being treated at the relevant instant, the images examined during the first step being transformed by way of to selected mapping rules prior to the determination of the similarity measure. On the basis of the similarity measure determined in the second step it is then decided whether the mapping rules selected in the first step are optimum or require further optimization. In the first case one or more further images are examined and the steps 1 and 2 are performed again, whereas in the second case the procedure returns to the step 1 in order to execute a further optimization of the mapping rules for the same images in an iterative manner. A limit value or an extreme value for the similarity measure can thus be used as a criterion for determining whether or not a mapping rule is optimum.

It is advantageous to examine each time only a single image to be registered and to optimize the corresponding mapping rule for this image in conformity with the described method. However, it is also feasible to vary the mapping rules for a plurality of images or all images simultaneously and to determine the similarity measure after each step of the variation process.

Preferably, characteristic structures or characteristic image values in the images are used for the registration, it being possible to select different or identical characteristic features for each image to be registered.

The mapping rules to be determined should preferably compensate for arbitrary geometrical changes of the object imaged, notably for translations, rotations, compressions and expansions. However, it is also feasible to restrict the changes to be compensated, for example to translations.

In a preferred embodiment of the invention the image registration concerns a series of medical images of an object to be examined, notably a series of two-dimensional or three-dimensional images formed by means of a medical imaging modality. All of said images may have been acquired by means of the same medical imaging modality, for example a temporal series of images formed by means of X-ray fluoroscopy. However, the images may also have been acquired by means of different imaging modalities. Thus, it is also possible to register images that have been acquired by means of a magnetic resonance tomography apparatus with images that have been acquired by means of an ultrasound device.

The invention can be used particularly advantageously for functional magnetic resonance tomography wherein temporal series of images of the brain are used for the study of brain activities in response to external stimuli. In order to arrive at reliable results for such a study, a very high accuracy is required for the registration; such a high accuracy can be achieved by means of the invention.

The invention also relates to a registration device as disclosed in claim 8, which device includes a storage unit for storing images and an arithmetic unit for determining the mapping rules and the similarity measure. The construction of this device may also be further elaborated so as to realize embodiments that are identical or similar to and compatible with the method in accordance with the invention as described above and also as disclosed in the dependent claims for the method.

The invention also relates to a device for the temporally successive acquisition of a series of medical image data from an examination zone of an object to be examined, which device includes a registration device in accordance with the invention. An acquisition device of this kind may be, for example a magnetic resonance tomography apparatus, a computed tomography apparatus, an X-ray device or an ultrasound device.

Finally, the invention also relates to a computer program for carrying out the method in accordance with the invention and/or for controlling the registration device in accordance with the invention.

The invention will be described in detail hereinafter with reference to the drawings. Therein:

Figure 1:
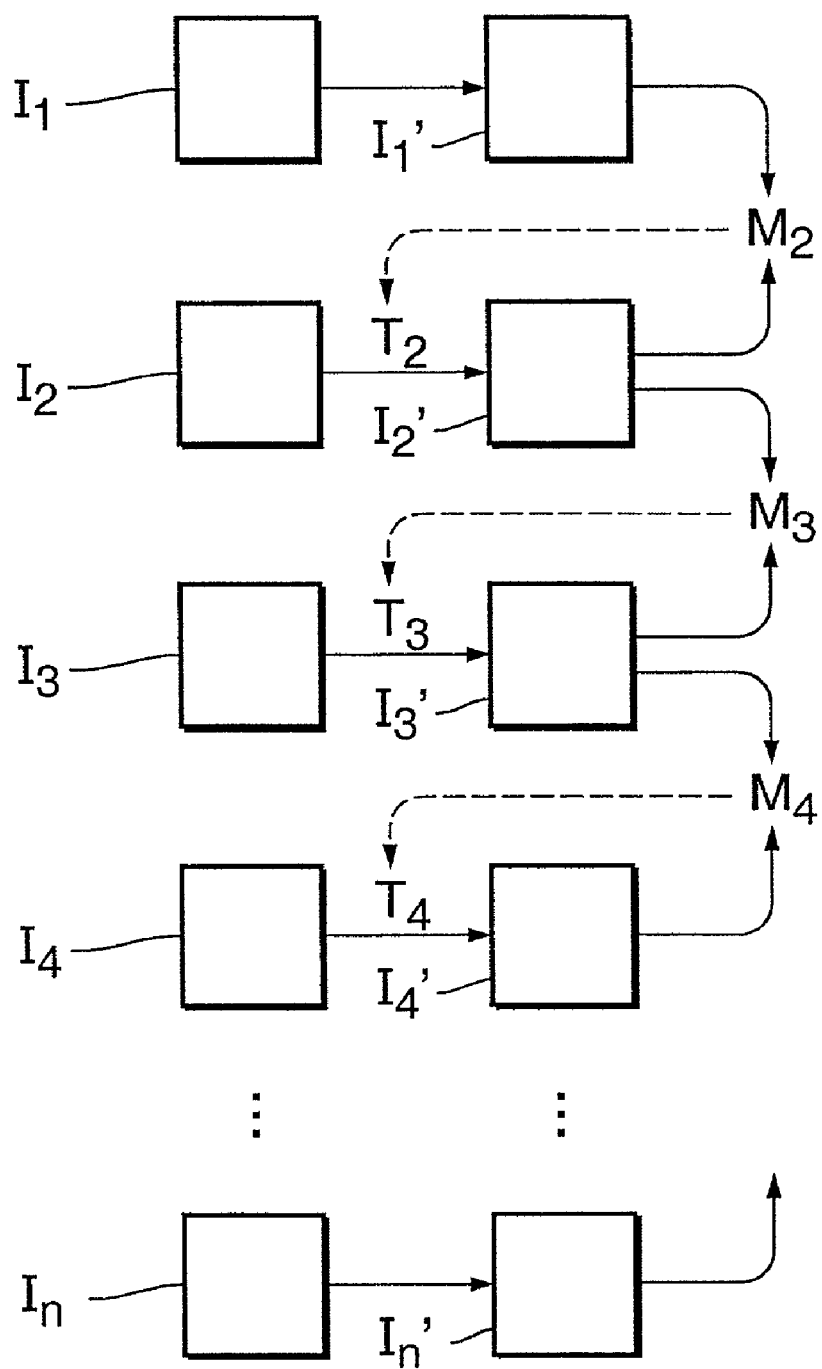
FIG. 1 is a block diagram of a first known version of a registration method.

FIG. 1 shows a block diagram of a first version of a registration method in accordance with the state of the art. This Figure shows, by way of example, four images $I_1$, $I_2$, $I_3$, $I_4$ of a series of n temporally successively acquired images $I_1 \ldots I_n$ that are to be registered relative to one another. These images may be, for example temporally successively acquired two-dimensional or three-dimensional slice images of the brain of a patient that have been acquired by means of a magnetic resonance tomography apparatus in order to carry out functional studies of individual parts of the brain in response to external stimuli. For the registration it is necessary to derive mapping rules $T_2$, $T_3$, $T_4 \ldots T_n$ which are used to transform the original images $I_2$, $I_3$, $I_4 \ldots I_n$ into registered images $I_1'$, $I_2'$, $I_3'$, $I_4' \ldots I_n'$ in order to ensure that these images are registered with one another. The mapping rules $T_2$, $T_3$, $T_4 \ldots T_n$ thus serve to determine the positional relationships in space between the images $I_1$ to $I_n$.

According to the version that is shown each time two neighboring images are registered, which means that first the image $I_2$ is registered with the image $I_1$, resulting in the registered image $I_2'$. Subsequently, the image $I_3$ is registered with the previously registered image $I_2'$, resulting in the registered image $I_3'$. Subsequently, the image $I_4$ is registered with the registered image $I_3'$; this yields the registered image $I_4'$.

Two images are registered with one another in such a manner that a first tentative mapping rule $T_2$ is defined for the image $I_2$, which rule is used to transform the image $I_2$ into the image $I_2'$. The similarity measure M2 is then determined between the image $I_2'$ obtained and the reference image $I_1'$, in this case corresponding to the image $I_1$, which similarity measure forms an indication as to whether the similarity between the images $I_2'$ and $I_1'$ (or $I_1$) is adequate so that the mapping rule $T_2$ need not be further modified. The similarity measure may be determined as, for example the variances of voxels, that is, of individual small image points or groups of image points, in the images $I_1'$ and $I_2'$. When the similarity measure reveals that the similarity is not yet adequate, the mapping rule is step-wise varied until the similarity measure each time calculated indicates that the similarity between the images $I_2'$ and $I_1'$ is good enough.

The procedure for the registration of an image with the respective preceding, already registered image is identical to the procedure described above. This means that the mapping rule $T_3$ is determined via the similarity measure M3 between the images $I_3'$ and $I_2'$. Analogously, the mapping rule $T_4$ is then determined between the images $I_4'$ and $I_3'$ by way of the similarity measure M4. This procedure continues until all images have been registered with the respective preceding image. This method has the drawback that each image is always registered exclusively with the respective temporally preceding image, so that errors that occur in the first registration steps are propagated in further registration steps.

Figure 2:
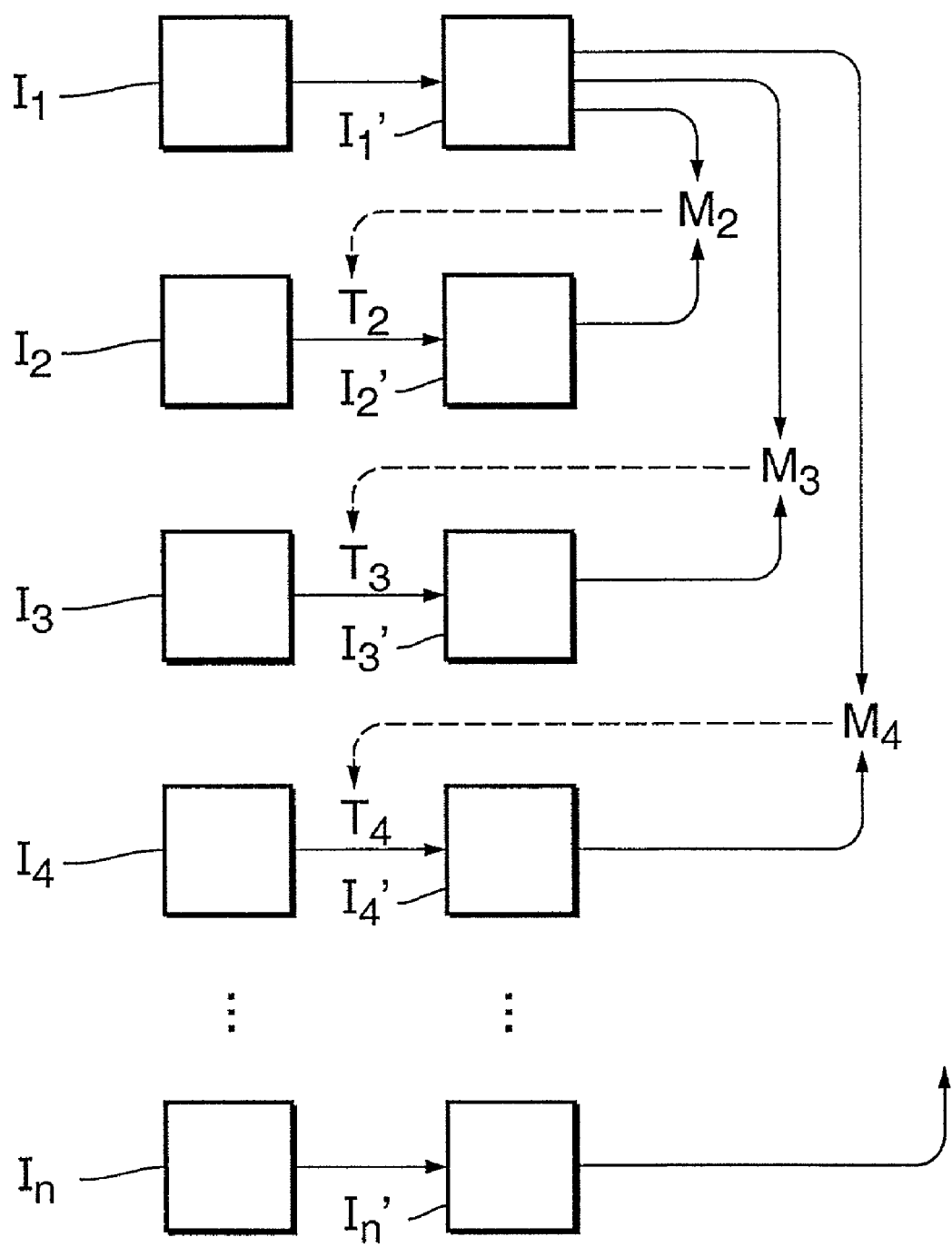
FIG. 2 is a block diagram of a second known version of a registration method.

FIG. 2 shows a second version of a registration method in conformity with the state of the art. In contrast with the version shown in FIG. 1, all images $I_2$, $I_3$, $I_4$. In are now registered with a fixed reference image $I_1'$ which again corresponds to the image $I_1$. The mapping rule $T_2$ is then determined by means of the similarity measure M2 which is determined from the images $I_2'$ and $I_1'$ as in the version shown in FIG. 1. Unlike in the version shown in FIG. 1, the similarity measure M3 and the similarity measure M4 for determining the mapping rules $T_3$ and $T_4$ are determined from the image $I_3'$ and the reference image $I_1'$, and from $I_4'$ and $I_1'$, respectively.

This method, however, has the drawback that it may occur that not all structures that are present in the reference image $I_1'$ and are used for the registration are also present in all other images, so that the registration takes place with different reference points. Conversely, it may also occur that structures that are present in the individual images $I_2$, $I_3$, $I_4 \ldots I_n$ to be registered and are particularly suitable for the registration are absent in the reference image $I_1'$.

Figure 3:
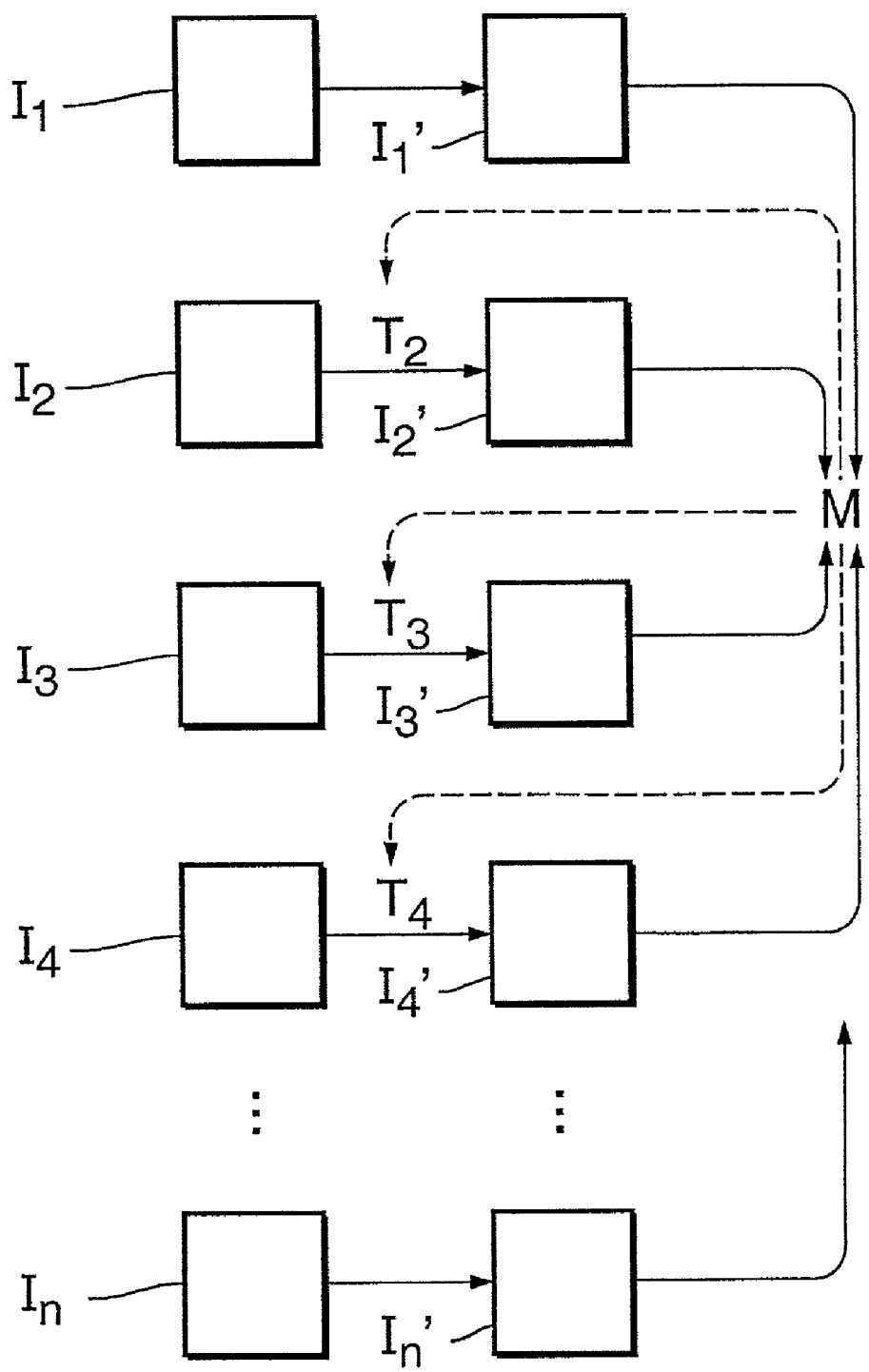
FIG. 3 is a block diagram of a version of the registration method in accordance with the invention.

FIG. 3 shows a block diagram of a version of the method in accordance with the invention. According to this version the mapping rules $T_2$, $T_3$, $T_4 \ldots T_n$ are all determined on the basis of the same similarity measure M which is determined from all images $I_1'$, $I_2'$, $I_3'$, $I_4' \ldots I_n'$. The determination of the mapping rules $T_2$, $T_3$, $T_4 \ldots T_n$ can be performed in steps by determining first the mapping rule $T_2$, after which the similarity measure M is determined from all images $I_1'$–$I_4'$ after each variation in order to check whether the mapping rule is good enough. This procedure can be continued until an optimum has been found for the mapping rule $T_2$. Subsequently, in the next steps the mapping rule $T_3$ can be determined and subsequently $T_4$, that is, each time while utilizing the same similarity measure M from all images. Alternatively, some or all mapping rules can be varied simultaneously and subsequently the similarity measure can be determined; this operation is then continued in an alternating fashion until an optimum has been found for the similarity measure M.

Mathematically speaking, the similarity measure can be calculated, for example as a variance of a voxel that is based on a gray value (considered as a function of time), so as to be integrated over the entire image volume; to this end, use is made of the following formula:

$$V(I_1, \ldots, I_n) = \frac{1}{n 1_x 1_y 1_z} \sum_{i=1}^{1_x} \sum_{j=1}^{1_y} \sum_{k=1}^{1_z} W_{ijk} \sum_{t=1}^{n} (I_t(i,j,k) - \overline{I_t}(i,j,k))^2.$$

Therein, $I_1, \ldots, I_n$ denote the images of a temporal series and $1_x$, $1_y$ and $1_z$ denote the number of voxels along each co-ordinate axis. Moreover, it holds that:

$$\overline{I_t}(i,j,k) = \frac{1}{n} \sum_{t=1}^{n} I_t(i,j,k),$$

which indicates the average gray value of a voxel. Moreover, a factor $W_{ijk}$ can be introduced so as to make the effect of voxels that are situated at the edges of the image less than that of voxels that are situated at the at the center of an image.

In order to optimize the similarity measure, n-1 mapping rules must be determined in the case of n images. When fixed transformations with three rotation parameters and three translation parameters are assumed, the total number of parameters thus amounts to 6n-6.

The steps for the iterative determination of the mapping rules will be illustrated hereinafter on the basis of two versions. According to a first version the following steps are executed:

1. Registration of the first two images $I_1$ (=$I_1$') and $I_2$ yields the mapping rule $T_2$. All other images $I_3, \ldots, I_n$ are ignored during this step. The similarity measure is then given by:

$$V(I_1, I_2) = \frac{1}{2 1_x 1_y 1_z} \sum_{i=1}^{1_x} \sum_{j=1}^{1_y} \sum_{k=1}^{1_z} W_{ijk} \sum_{t=1}^{2} \left(I_t(i,j,k) - \frac{(I_1(i,j,k) + I_2(i,j,k))}{2}\right)^2$$

2. When s images ($I_1', \ldots, I_s'$) have been registered after a plurality of steps, the registration of the image $I_{s+1}$, and the determination of the mapping rule $T_{s+1}$, are obtained by optimization of for which it holds that:

$$I_t'(i,j,k) = \frac{1}{s+1}\left(\sum_{t=1}^{s} I_t(i,j,k) + I_{s+1}(i,j,k)\right)$$

This results in $I'_{s+1}$.

3. This iterative procedure is terminated after n-1 iterations, after which $I_1', \ldots, I_n'$ are available.

In conformity with a second version, all images $I_1, \ldots, I_n$ are simultaneously optimized.

The method in accordance with the invention offers a significant improvement of the registration result, that is, of the mapping rules, in comparison with the registration result offered by the known methods.

Figure 4:
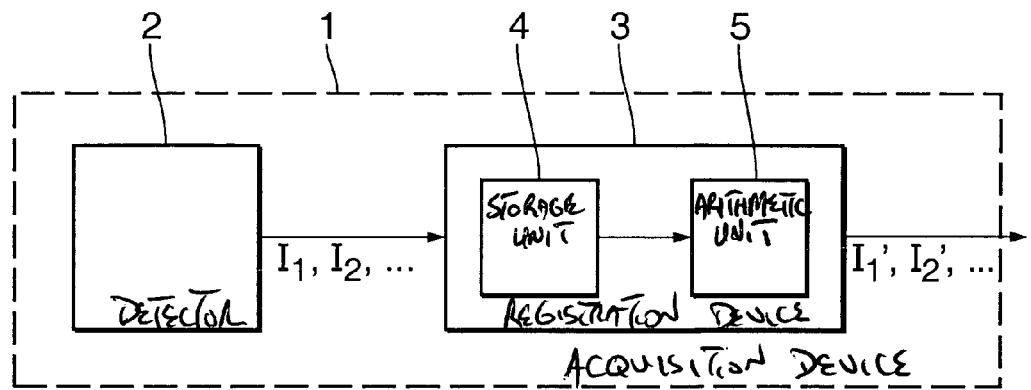
FIG. 4 is a block diagram of an image acquisition device in accordance with the invention.

FIG. 4 shows a device for the temporally successive acquisition of a series of image data, that is, notably medical images of an examination zone of a patient. The device 1 may be, for example a magnetic resonance tomography apparatus and includes a detector 2 for the acquisition of the image data $I_1, I_2, \ldots$ that is applied to the registration device 3. This device includes on the one hand a storage unit 4 for the storage of the image data and an arithmetic unit 5 for the calculation of the mapping rules and the similarity measure. The registered images $I_1', \ldots I_2'$, are applied from the device 3 to a further image evaluation unit that is not shown herein.

The invention is restricted neither to the embodiments shown nor to the described application for medical image data. The invention can be used for the registration of arbitrary temporally successively acquired images of the same object for which a high registration accuracy is required in order to compensate notably for motions of the object or of the image acquisition device during the image acquisition. It is feasible, for example, to use the invention also for motion correction of digital video recordings.

The method in accordance with the invention may be carried out by way of a suitable computer program that is executed by an image processing computer. Such a computer program may also be stored in the image data acquisition device and may control a corresponding registration device.

The invention claimed is:

1. A method for registration of a series of at least three temporally successively acquired images of an object, including transforming individual images to be registered registered images by implementation of an individual mapping rule with respect to each individual image to be registered, and determining a similarity measure used with the mapping rule, wherein a common similarity measure of all images is used to determine individual mapping rules for the individual images to be registered.

2. A method as claimed in claim 1, wherein the step of determining the mapping rules is performed iteratively in that alternately one or more mapping rules are varied, and that the similarity measure of all images is determined by $$V(I_1, \ldots, I_{s+1}) = \frac{1}{(s+1) 1_x 1_y 1_z} \sum_{i=1}^{1_x} \sum_{j=1}^{1_y} \sum_{k=1}^{1_z} W_{ijk} \left(\sum_{t=1}^{s}(I_t'(i,j,k) - \overline{I_t'}(i,j,k))^2 + (I_{s+1}(i,j,k) - \overline{I_{s+1}'}(i,j,k))^2\right)$$

means of said varied mapping rules until a given limit value or an extreme value is reached for the similarity measure.

3. A method as claimed in claim 1, wherein the step of determining the mapping rules for the individual images to be registered is performed in sub-step, in which sub-step only a single mapping rule is varied, the similarity measured thereby, the sub-steps repeated until an optimum is found, and wherein a further optimum mapping rule is determined.

4. A method as claimed in claim 1, whereinm a characteristic structures or characteristic image values in the individual images are used for the registration.

5. A method as claimed in claim 1, wherein the mapping rules compensate for arbitrary geometrical variations of the object, notably translations, rotations, compressions and expansions.

6. A method as claimed in claim 1, used for the registration of a series of medical images of an object to be examined, notably a series of two-dimensional or three-dimensional images acquired by means of a medical imaging modality.

7. A method as claimed in claim 1, used for the registration of a series of images, notably images of the brain, that have been acquired by means of functional magnetic resonance tomography.

8. A device for registration of a series of at least three temporally successively acquired images of an object, comprising:
   a storage unit for storing images, and
   an arithmetic unit for determining individual mapping rules for the transformation of individual images to be registered into registered images, wherein a similarity measure is used for the determination of the mapping rules, and wherein the arithmetic unit uses a common similarity measure of all individual images to determine the mapping rules for the of the image.

9. A device for the temporally successive acquisition of a series of medical image data of an examination zone of an object to be examined, comprising a registration device as in claim 8.

10. A computer program readable medium for receiving, storing and transferring a set of computer readable instructions, which may be used to cause a processor to implement a method for the registration of a series of at least three temporally successively acquired images of an object, including transforming the individual images to be registered into registered images using an individual mapping rule to register each image for registration, and including that a similarity measure is used to determine the mapping rule, wherein a common similarity measure of all images is used to determine the mapping rules for each image for registration, and including controlling a device for registration of the series of the acquired images which device includes a storage unit for storing images and an arithmetic unit for determining the individual mapping rules for the transformation of individual images to be registered into the registered images, the common similarity measure used for determining the mapping rules, and wherein the arithmetic unit maintains that a common similarity measure of all images is used to determine the mapping rules for the images to be registered.

* * * * *